(12) United States Patent
Lange et al.

(10) Patent No.: US 6,609,065 B1
(45) Date of Patent: Aug. 19, 2003

(54) GUIDANCE PATTERN ALLOWING FOR ACCESS PATHS

(75) Inventors: Arthur F. Lange, Sunnyvale, CA (US); Robert Allan, Halswell (NZ)

(73) Assignee: Trimble Navigation Ltd., Sunnyvale, CA (US)

( * ) Notice: Subject to any disclaimer, the term of this patent is extended or adjusted under 35 U.S.C. 154(b) by 0 days.

(21) Appl. No.: 10/146,828

(22) Filed: May 15, 2002

Related U.S. Application Data

(62) Division of application No. 09/891,830, filed on Jun. 25, 2001, now Pat. No. 6,549,849.

(51) Int. Cl.[7] .............................................. G01C 21/26
(52) U.S. Cl. ..................... 701/213; 701/207; 701/211
(58) Field of Search ................................ 701/200–213, 701/50, 215, 224; 342/357.06, 357.17, 357.08; 239/1

(56) References Cited

U.S. PATENT DOCUMENTS

| | | | | |
|---|---|---|---|---|
| 4,630,773 A | * | 12/1986 | Ortlip .............................. 239/1 |
| 4,847,773 A | * | 7/1989 | van Helsdingen et al. .. 701/200 |
| 4,881,080 A | * | 11/1989 | Jablonski ............... 342/357.08 |
| 4,939,663 A | * | 7/1990 | Baird ......................... 701/208 |
| 6,463,374 B1 | * | 10/2002 | Keller et al. .................. 701/50 |

OTHER PUBLICATIONS

San Jose Mercury News, Section F, Tue. May 1, 2001, "Taking Guesswork out of Growing", 4 pgs.

* cited by examiner

Primary Examiner—Richard M. Camby
(74) Attorney, Agent, or Firm—Blakely Sokoloff Taylor & Zafman

(57) ABSTRACT

A method and apparatus for a guidance system that gives a farmer a choice of different approaches to coping with the problem of compaction caused by vehicular traffic are disclosed.

14 Claims, 11 Drawing Sheets

GUIDANCE PATTERN ALLOWING FOR ACCESS PATHS

This application is a divisional application of application Ser. No. 09/891,830, filed on Jun. 25, 2001 now U.S. Pat. No. 6,549,849.

FIELD OF THE INVENTION

The present invention relates to navigation. More particularly, the present invention relates to navigation in agriculture for guidance patterns allowing for access paths.

BACKGROUND OF THE INVENTION

Compaction is caused by vehicular traffic on a farm field. Vehicular traffic includes planting, applying chemicals, harvesting, etc. Excess compaction reduces crop yield. It may be desirable to manage compaction to obtain maximal crop yields. One existing method of compaction management, called compaction concentration, is to only drive the vehicle on certain lanes, sacrificing the plant growth on these lanes. Another method, called compaction spreading, is driving on the field moving to a different path from previous driven paths.

Manual compaction management suffers from inaccuracies, inconsistencies, and errors due to human control. For example, a human driver may not be able to steer consistently, may be unable to see adequately due to weather or night conditions, etc.

SUMMARY OF THE INVENTION

A method and apparatus for a guidance system that gives a farmer a choice of different approaches to coping with the problem of compaction caused by vehicular traffic on a farm field are disclosed.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
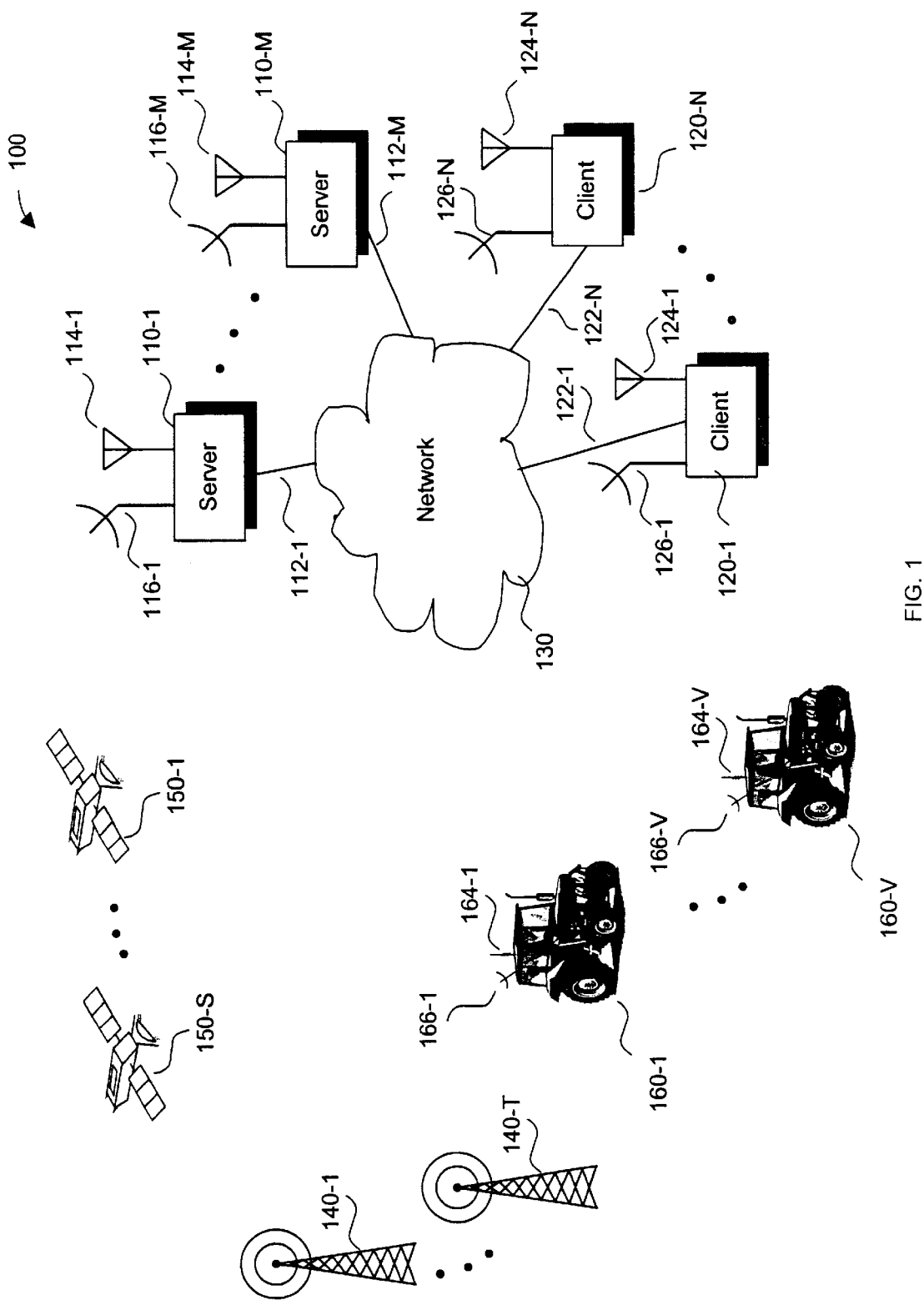
FIG. 1 illustrates an exemplary environment providing a guidance pattern allowing for access paths in an agricultural system.

A method and apparatus for a guidance system that gives a farmer a choice of two different compaction management techniques to cope with the problem of compaction caused by vehicular traffic on a farm field are described. One technique is compaction concentration, the other compaction spreading.

For purposes of discussing the invention, it is to be understood that various terms are used by those knowledgeable in the art to describe techniques and approaches.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, compact disk- read only memories (CD-ROMs), and magnetic-optical disks, read-only memories (ROMs), random access memories (RAMs), electrically programmable read-only memories (EPROM)s, electrically erasable programmable read-only memories (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

The present invention describes a method and apparatus for a guidance system that gives a farmer a choice of two different methods of compaction management. In one embodiment, a position-determining unit feeds positions to a computer. The computer has a library of previously traveled vehicle paths and presents the user with a choice of concentrating the compaction or spreading out the compaction. If the user selects concentrating guidance then the user is presented with guidance information through an off-line guidance indicator system (for instance a lightbar guidance system or computer display with off line information) or automatically steers the tractor on a previously selected path across the field. If the user has selected spreading out the compaction, then the computer chooses a path adjacent to the previously used path to guide the driver (or automatic steering control unit) to the new path, thus spreading out the compaction. This is done by recording the vehicle path over the field and allowing the user to choose GPS aided guidance over the previous path, to concentrate compaction in a small area, or a new path, to spreading out the compaction.

Thus, the present invention aids the farmer with managing compaction by using new paths if selected. This invention allows for the user to select an offset guidance path from all previously driven paths over the field, thus spreading out compaction. The user has the ability to determine on a field by field basis which method of compaction management he wishes to use.

FIG. 1 illustrates one embodiment of a guidance system 100 in which the techniques disclosed may be applied. A plurality of computer systems are shown in the form of M servers (110-1 through 110-M), and N clients (120-1 through 120-N), which are coupled to each other via network 130. A plurality of terrestrial based wireless communications links are shown in the form of T towers (140-1 through 140-T). A plurality of space based communications links are shown as S satellites (150-1 through 150-S). A plurality of vehicles are shown in the form of V tractors (160-1 through 160-V). The M servers and N clients may also be coupled to each other via space based communications links 150-1 through 150-S, as well as terrestrial based wireless communications links 140-1 through 140-T, or a combination of satellite and terrestrial wireless links. Additionally, the V tractors 160-1 through 160-V may be in communication with the satellites 150-1 through 150-S and/or the terrestrial wireless links 140-1 through 140-T.

Servers 110-1 through 110-M may be connected to network 130 via connections 112-1 through 112-M, respectively. Servers 130-1 through 130-M may be connected to the terrestrial links 140-1 through 140-T via antennae 114-1 through 114-M, respectively. Servers 110-1 through 110-M may be connected to space based communications links 150-1 through 150-S via dish antennae 116-1 through 116-M.

Clients 120-1 through 120-N may be connected to the network 130 via connections 122-1 through 122-N. Clients 120-1 through 120-N may be connected to the terrestrial links 140-1 through 140-T via antennae 124-1 through 124-N. Clients 120-1 through 120-N may be connected to space based communications links 150-1 through 150-S via dish antennae 126-1 through 126-N.

Tractors 160-1 through 160-V may be connected to the terrestrial links 140-1 through 140-T via antennae 164-1 through 164-V. Tractors 160-1 through 160-V may be connected to space based communications links 150-1 through 150-S via antennae 166-1 through 166-V. Terrestrial links 140-1 through 140-T and space and/or space based communications links 150-1 through 150-S may provide tractors 160-1 through 160-V with information such as positioning data, weather information, control information, task lists, etc. Tractors 160-1 through 160-V may provide terrestrial links 140-1 through 140-T and/or space based communications links 150-1 through 150-S with information such as position data, soil conditions, tasks completed, and tractor specific information such as control information, tire inflation, engine condition, running status, fuel status, etc.

Clients 120-1 through 120-N may also be connected to web sites, search engines, and/or database resources represented by servers, such as servers 110-1 through 110-M, via the network 130, through connections 122-1 through 122-N.

Clients 120-1 through 120-N may consist of, but are not limited to, for example, a personal computer, or other device capable of inputting and displaying information (set-top box and a television, a wireless telephone, a PDA (personal digital assistant), etc.). Applications may be running on the clients 120-1 through 120-N, while web pages and information being browsed may reside on the servers 110-1 through 110-M. Information may be coming from terrestrial sources 140-1 through 140T, and/or satellite links 150-1 through 150-S. For purposes of explanation, a single client 120-1 and a single tractor 160-1 will be considered to illustrate one embodiment of the present techniques. It will be readily apparent that such techniques may be easily applied to multiple clients and vehicles.

Network 130 may be a Wide Area Network (WAN), which includes the Internet, or other proprietary networks, such as America On-Line®, CompuServe®, Microsoft Network©, and Prodigy®. Note that alternatively the network 130 may include one or more of a Local Area Network (LAN), satellite link, fiber network, cable network, wireless network, or any combination of these and/or others. Network 130 may also include network backbones, long-haul telephone lines, Internet service providers, and various levels of network routers.

Terrestrial links 140-1 through 140-T may be, for example, long range navigation (LORAN), cellular links, etc. Space based communications links 170-1 through 170-S may be, for example, global positioning satellites (GPS), Glosnass, etc. Communications networks for the system 100 may be implemented in any number of environments.

Figure 2:
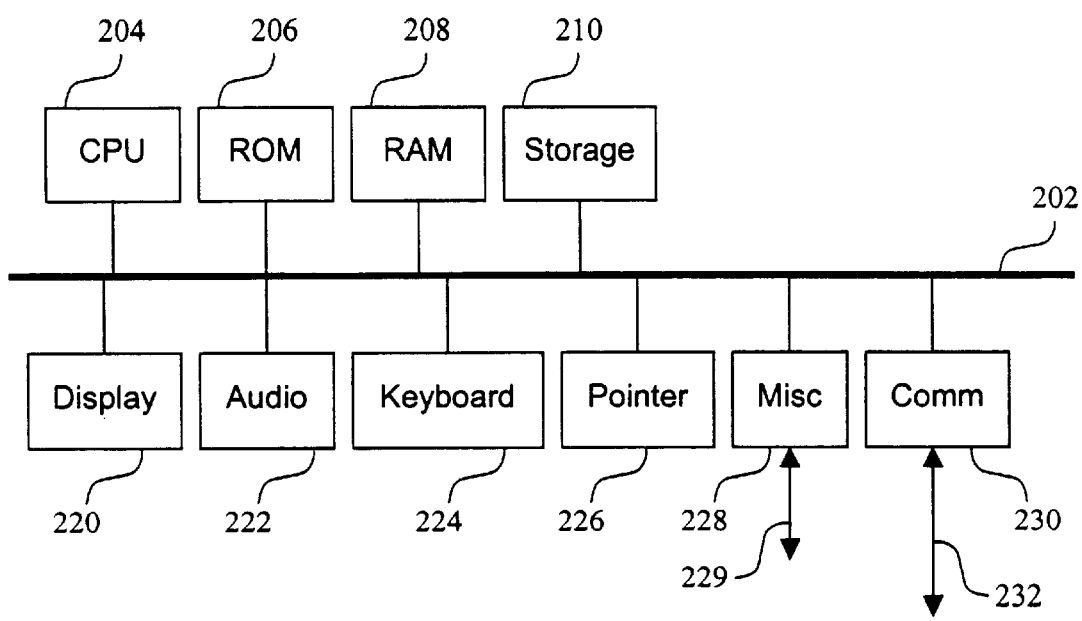
FIG. 2 is a block diagram of a computer system.

FIG. 2 illustrates a conventional personal computer in block diagram form, which may be representative of any of the clients and servers shown in FIG. 1 or any system aboard vehicles, such as, tractors 160-1 through 160-V. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), etc. The CPU 204 may be a single, multiple, or even a distributed computing resource. The ROM 206 may be any type of non-volatile memory, which may be programmable such as, mask programmable, flash, etc. RAM 208 may be, for example, static, dynamic, synchronous, asynchronous, or any combination. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Audio 222 may be a monophonic, stereo, three dimensional sound card, etc. The keyboard 224 may be a keyboard, a musical keyboard, a keypad, a series of switches, etc. The pointer 226, may be, for example, a mouse, a touchpad, a trackball, joystick, etc. I/O devices 228, might be a voice command input device, a thumbprint input device, a smart card slot, a Personal Computer Card (PC Card) interface, virtual reality accessories, etc., which may optionally connect via an input/output port 229 to other devices or systems. An example of a miscellaneous I/O device 228 would be a Musical Instrument Digital Interface (MIDI) card with the I/O port 229 connecting to the musical instrument(s). Communications device 230 might be, for example, an Ethernet adapter for local area network (LAN) connections, a satellite connection, a settop box adapter, a Digital Subscriber Line (xDSL) adapter, a wireless modem, a conventional telephone modem, a direct telephone connection, a Hybrid-Fiber Coax (HFC) connection, cable modem, etc. The external connection port 232 may provide for any interconnection, as needed, between a remote device and the bus system 202 through the communications device 230. For example, the communications device 230 might be an Ethernet adapter, which is connected via the connection port 232 to, for example, an external DSL modem. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

A subsystem may be, but is not limited to, one or more of the elements of FIG. 2. For example, Storage 210 may have a subsystem that handles how data is to be stored and retrieved. Audio 222 may have a subsystem that handles when to, for example, power down speakers. Communications device 230 may, for example, have a subsystem that needs to transfer information to the Storage 210 without using the main operating system upon receiving a message.

Figure 3:
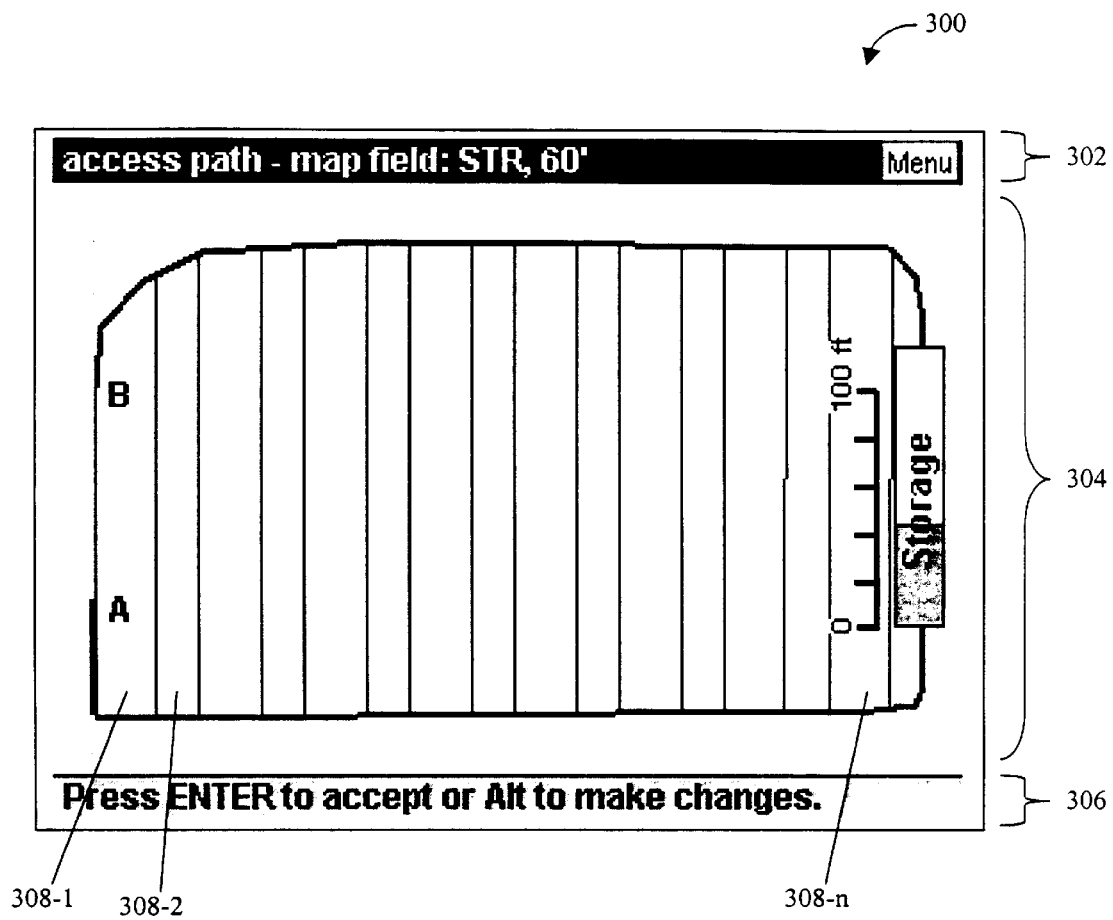
FIGS. 3, 4, and 5 illustrate various screen shots of a user interface for setting up access paths.

FIG. 3 illustrates a screen shot 300 of a user interface for setting up access paths. A status bar and menu selection 302 allows the user to see the status and select a menu. A graphical representation area 304 may contain, as shown here, an illustration indicative of the actual agricultural field with swaths (308-1, 308-2, through 308-n) running vertically. A prompt area 306 assists in guiding the user through using the setup process.

Figure 4:
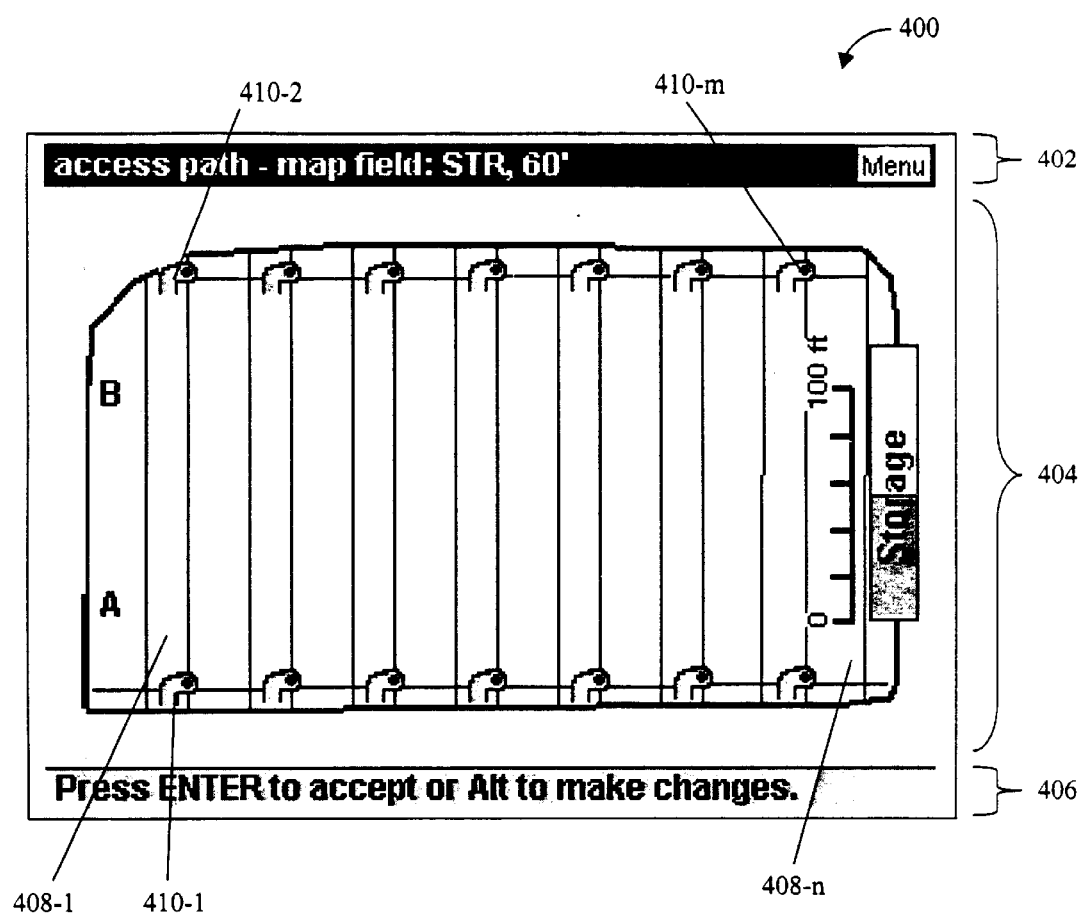

FIG. 4 illustrates a screen shot 400 of a user interface for setting up access paths. A status bar and menu selection 402 allows the user to see the status and select a menu. A graphical representation area 404 may contain, as shown here, an illustration indicative of the actual agricultural field with swaths (408-1 through 408-n) running vertically, and riser locations (410-1, 410-2, through 410-m). Swath 408-1 has risers 410-1 and 410-2 located at opposite ends of swath 408-1. A prompt area 406 assists in guiding the user through using the setup process.

Figure 5:
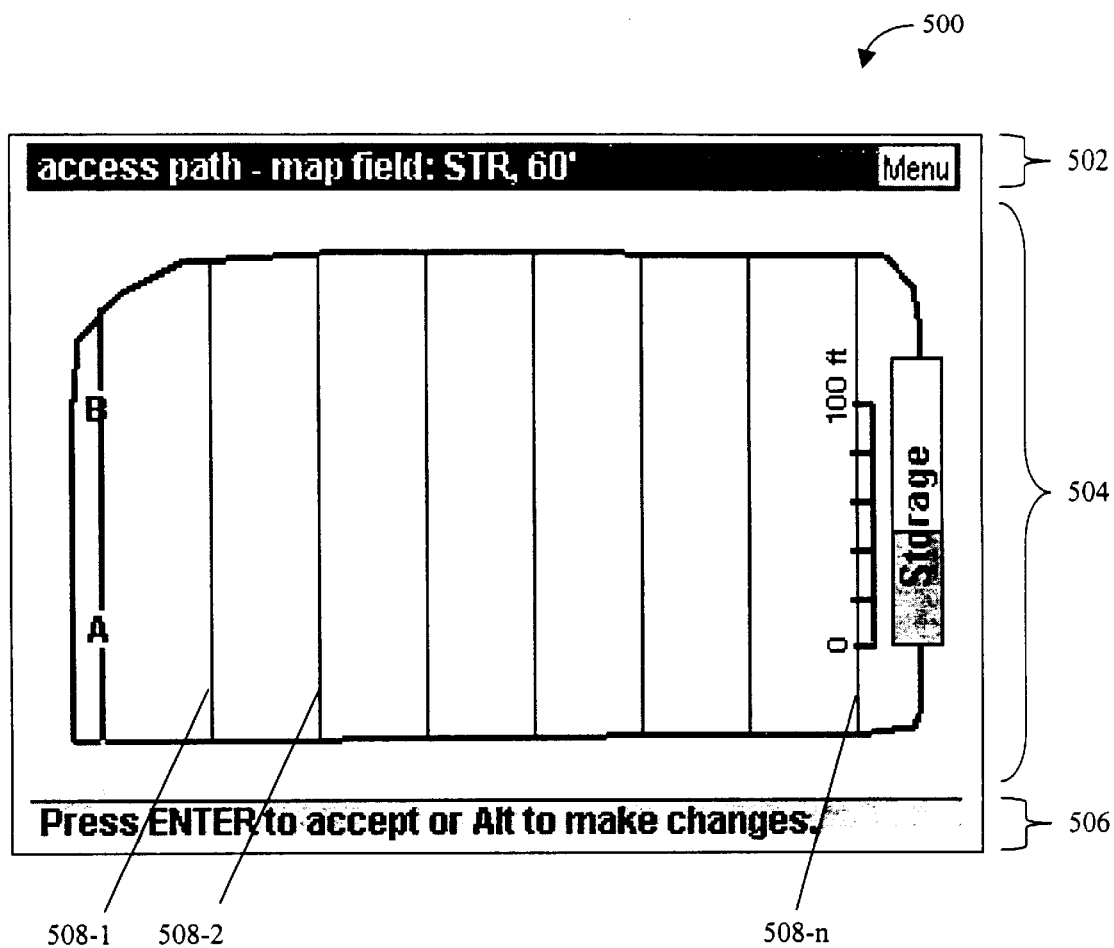

FIG. 5 illustrates a screen shot 500 of a user interface for setting up access paths. A status bar and menu selection 502 allows the user to see the status and select a menu. A graphical representation area 504 may contain, as shown here, an illustration indicative of the actual agricultural field access paths (508-1, 508-2 through 508-n) running vertically. A prompt area 506 assists in guiding the user through using the setup process.

Figure 6:
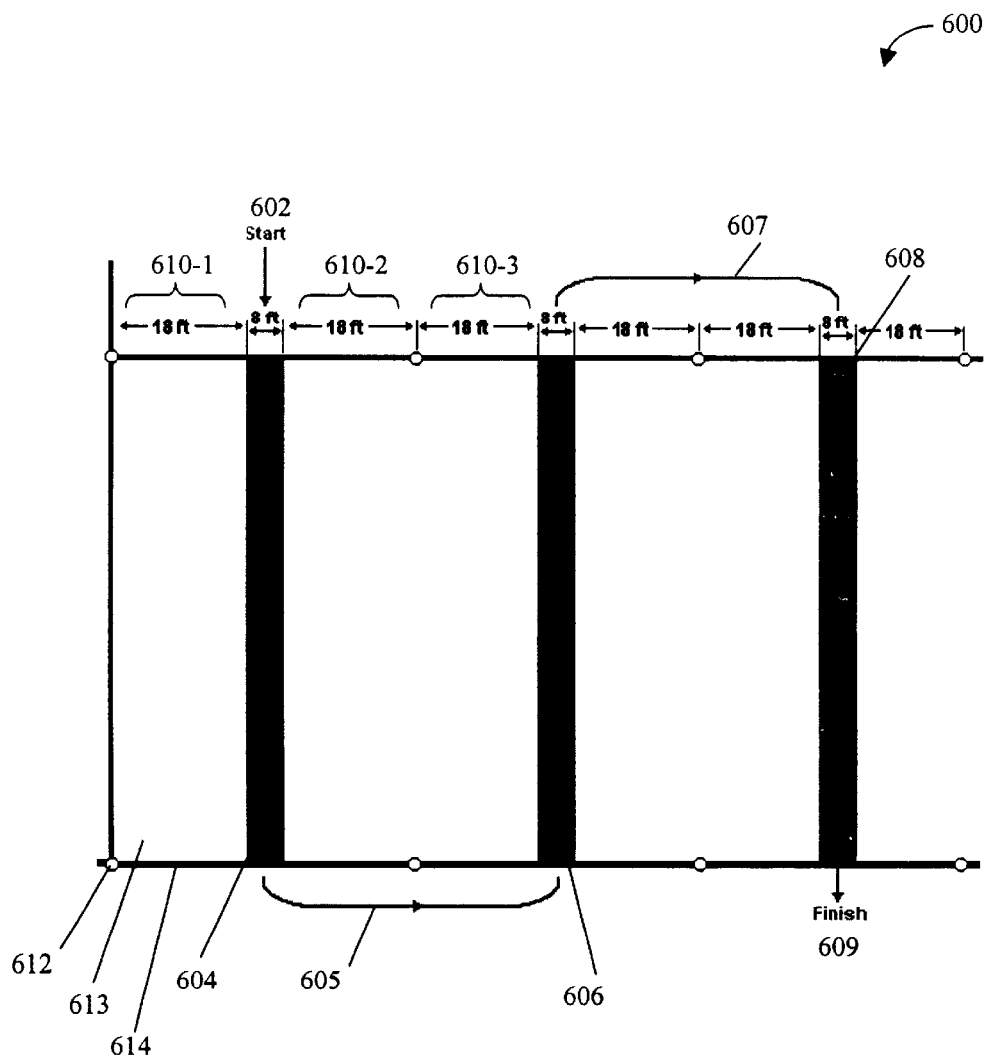
FIGS. 6 and 7 illustrate agricultural fields.

FIG. 6 illustrates an agricultural field 600 in more detail. Buried mainline pipes 614 are connected to risers 612. Drip tape 613 is indicated within a swath, for example, 610-1. Access paths are 604, 606, and 608. A vehicle using the access paths, may for example, travel from the start 602, along path 604, traverse along 605 to path 606, then transverse via 607 to path 608 and finish at 609. In this example, the swaths 610-1, 610-2, and 610-3 are 18 feet in width and the access paths 604, 606, and 608 are 8 feet in width.

Figure 7:
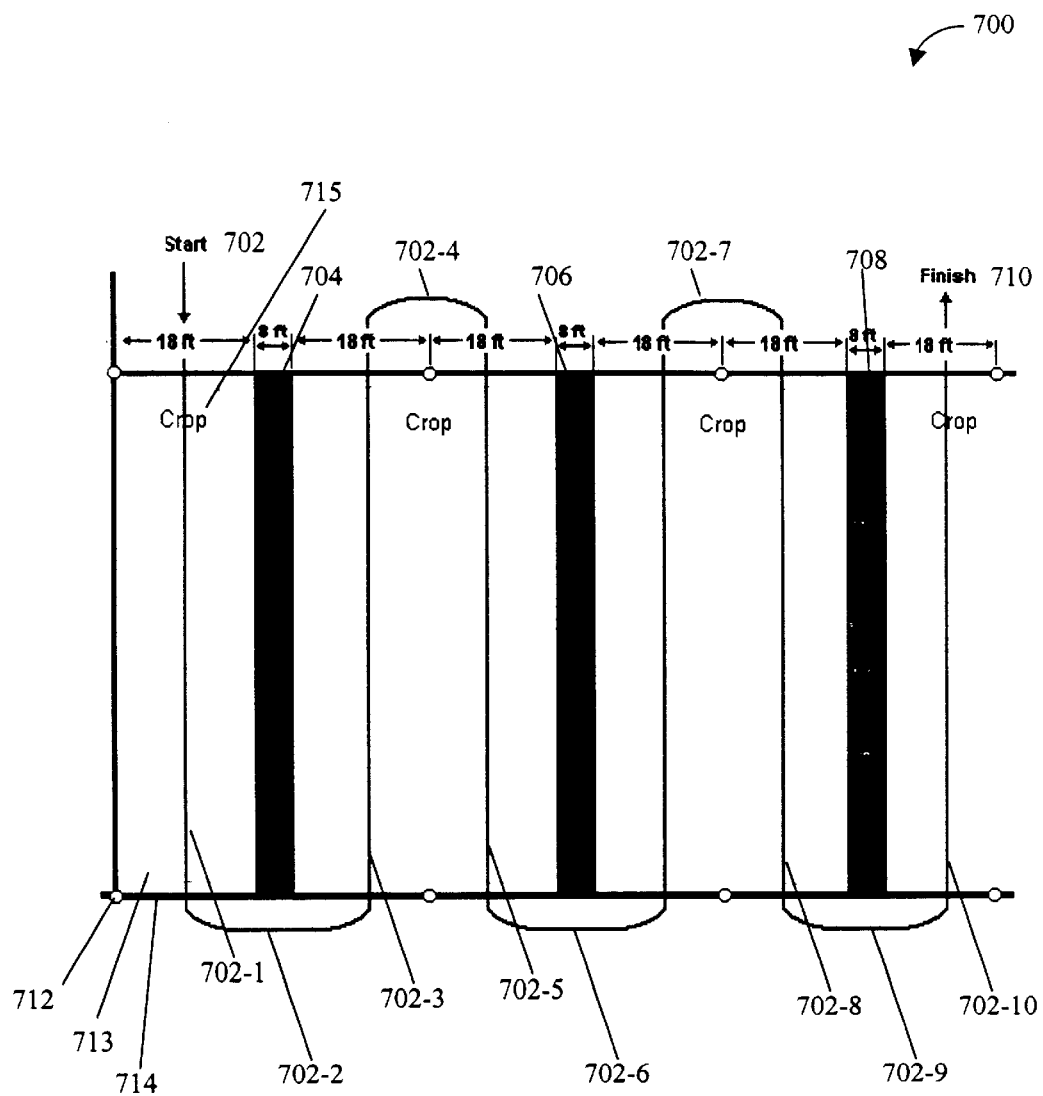

FIG. 7 illustrates an agricultural field 700 in more detail. Buried mainline pipes 714 are connected to risers 712. Drip tape 713 is indicated within a crop area, for example, 715. Access paths are 704, 706, and 708. In this figure, a vehicle may travel from the start 702, along paths 702-1 through 702-10 ending at finish at 710.

Figure 8:
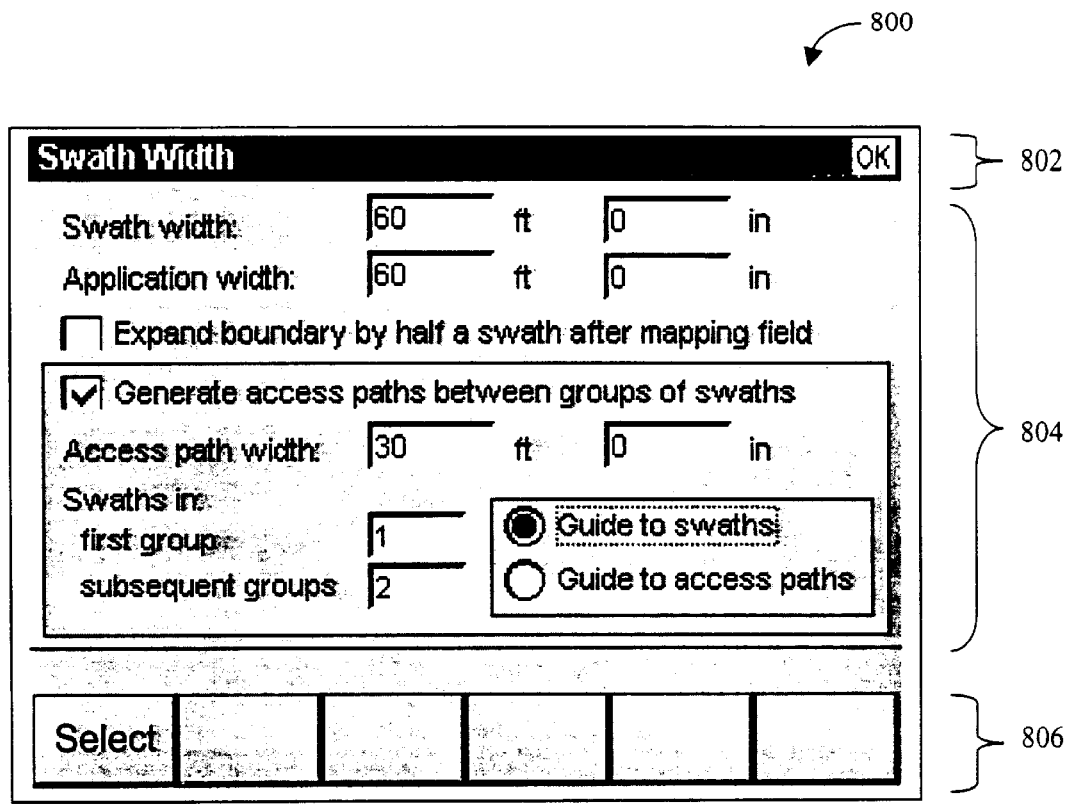
FIG. 8 illustrates a screen shot of a user interface for inputting information.

FIG. 8 illustrates a screen shot 800 of a user interface for setting up swath width information. A status bar and okay selection 802 allows the user to see the status and approve the input. A user input area 804 may contain, as shown here, various input boxes, check boxes, and radio buttons. A series of selection buttons 806 also assists in entering information.

Figure 9:
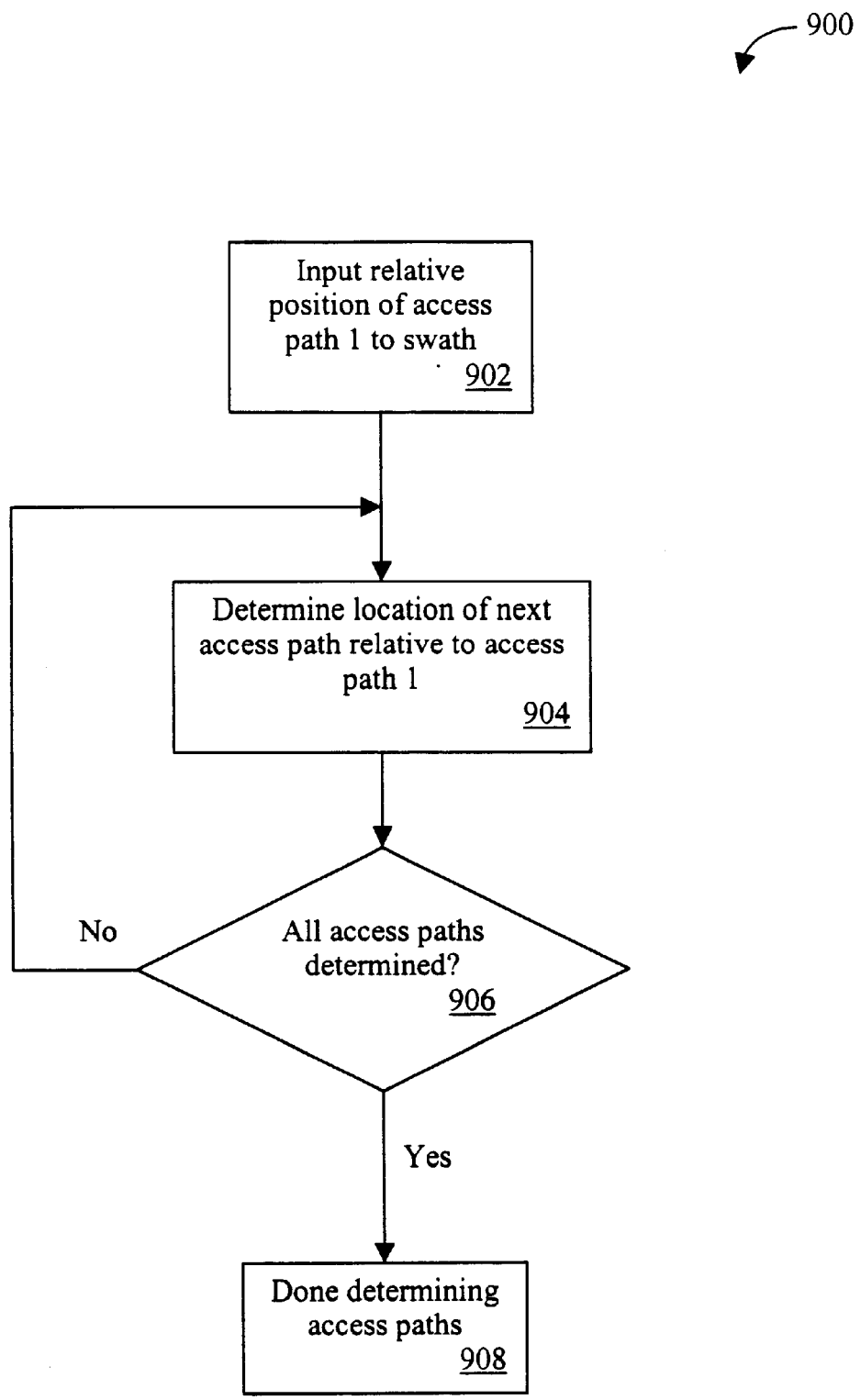
FIG. 9 illustrates generating access paths.

FIG. 9 illustrates generating access paths 900. At 902 the system either from a prior user input, a database, or a current user input, inputs the relative position of a first access path (access path 1) to a swath. At 904 the system determines the location of the next access path relative to access path 1. At 906 a check is made to see if all the access paths have been generated. If so then the system is done determining access paths 908, else if not done then the system determines the next access path 904.

Determination of the location of the next access path may take into account, but is not limited to, such factors as the user input, compaction method chosen, information about obstacles on the land, crop locations, riser locations, width of the equipment, adjacent roads, etc.

Figure 10:
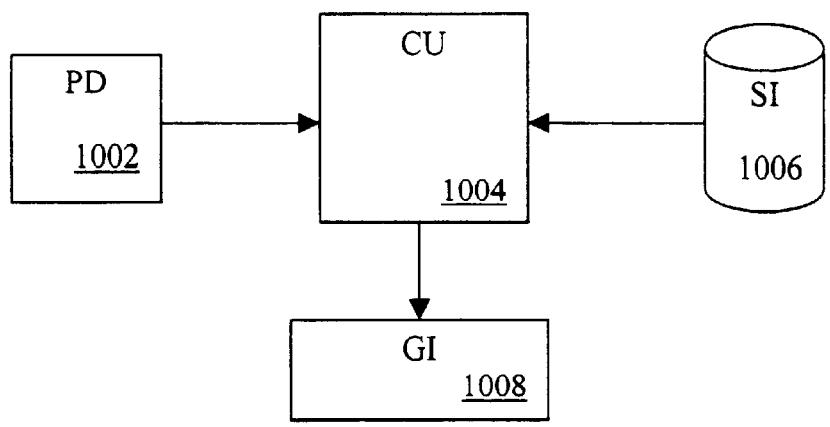
FIGS. 10 and 11 illustrate an embodiment of a system in block diagram form.

FIG. 10 illustrates one possible embodiment of a guidance system 1000. Control Unit (CU) 1004 receives inputs, for example, Position Data (PD) 1002 and Stored Information (SI) 1006. Positional data may come from a system, device, receiver, etc. that is capable of receiving, for example, GPS and/or Loran, or other positional signals. SI 1006 may contain, for example, previous paths that a vehicle, such as, a tractor has used on an agricultural field. In this way the CU 1004 may be configured to either repeat the previous path or an offset from a previous path, or an entirely new path. The CU 1004 communicates, in the case of a manually guided vehicle, to an operator of such a vehicle through a Guidance Indicator (GI) 1008. A GI may be, for example, a light bar display indicating the direction to steer or a display on, for example, a computer display screen indicating the desired path and an indication of the current position of the vehicle.

Figure 11:
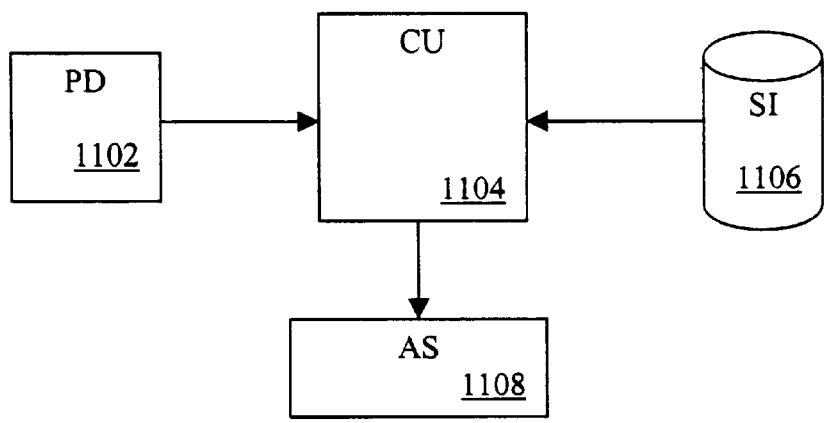

FIG. 11 illustrates another possible embodiment of a guidance system 1100. Control Unit (CU) 1104 receives inputs, for example, Position Data (PD) 1102 and Stored Information (SI) 1106. Positional data may come from a system, device, receiver, etc. that is capable of receiving, for example, GPS, Glosnass, and/or Loran, or other positional signals. SI 1106 may contain, for example, previous paths that a vehicle, such as, a tractor has used on an agricultural field. The CU 1104 may be configured to either repeat the previous paths or an offset from previous paths, or entirely new paths. The CU 1104 communicates, in the case of an automatically guided vehicle, to the vehicle's Automated Steering (AS) 1108.

Figure 12:
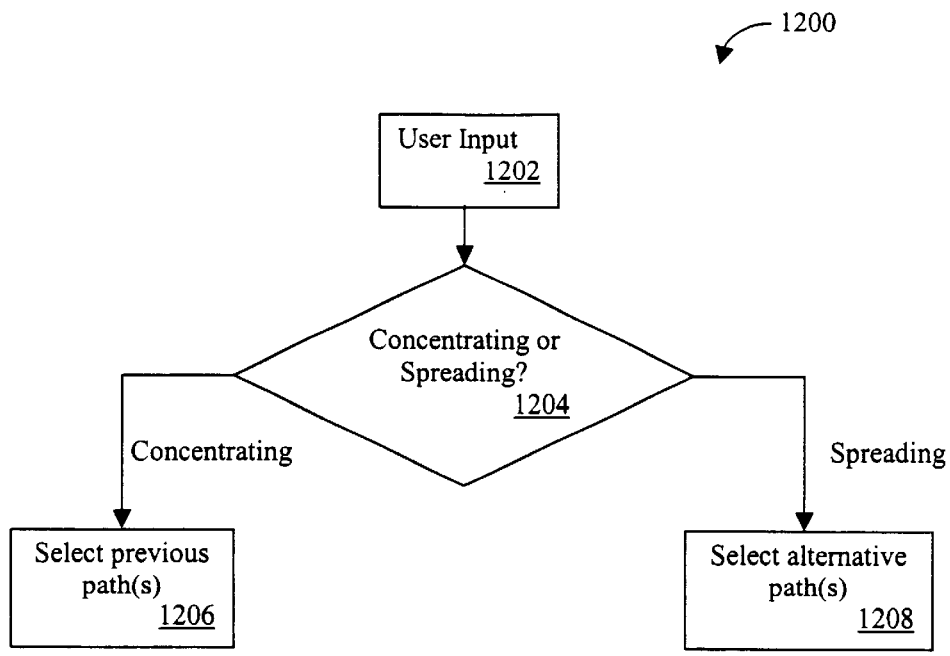
FIGS. 12 and 13 illustrate in flow charts an embodiments of handling user input.

FIG. 12 illustrates a flow chart 1200. Here the user input 1202 is accepted. At 1204 the user input 1202 is checked to see if the user has selected a concentrating or spreading compaction. If concentrating, then at 1206 previous path(s) are selected for a vehicle path. If the user input 1202 has indicated spreading, then at 1208 alternative path(s) are selected for a vehicle path. An alternative path, might be, for example a path offset a fixed distance from the most recently traveled path.

Figure 13:
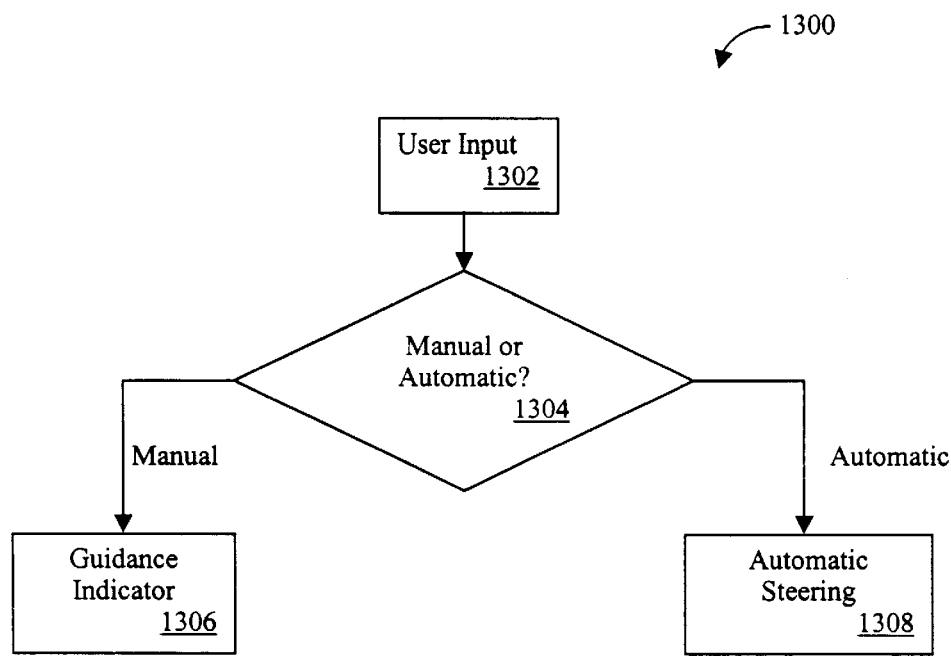

FIG. 13 illustrates a flow chart 1300. Here the user input 1302 is accepted. At 1304 the user input 1302 is checked to see if the user has selected manual or automatic steering. If manual, then at 1306 a guidance indicator would assist a driver by indicating a vehicle path or steering directions for a path. If the user input 1302 has indicated automatic, then at 1308 automatic steering controls the vehicle path traveled.

It is to be appreciated that the architecture and functionality described above may have other embodiments. For example, how the client is linked to the guidance system or controller for a vehicle may have various embodiments. For example, a client controlling a tractor, in one embodiment may be located on the tractor itself, in another embodiment the client may reside remotely, for example, at a farmer's home, in the form of a personal computer, PDA, or a device hooked to a television. For example, in one embodiment, the client might be a personal computer located at a farmer's house with it controlling a vehicle via wireless control. Thus, while the client issues commands to the controller on what to do, where the client is physically located is variable. The client may be in the vehicle or on a personal computer at a farmer's home or located somewhere on the Internet, etc.

Additionally, it is to be appreciated that in the present invention, in one embodiment, only a controller for steering and vehicle control may need to be located on a tractor or farm vehicle. That is, the actual controlling of, for example, the steering on a tractor may not require a client to be located on the tractor. All that is needed is that the controller receive the appropriate commands, whether they come from a client physically located on the vehicle or from, for example, a wireless communication link with the client located remotely. Thus in one embodiment the vehicle may have a controller only, and in yet another the controller and the client may be co-located on the vehicle.

Thus, a method and apparatus for a guidance system that gives a farmer a choice of different approaches to coping with the problem of compaction caused by vehicular traffic are disclosed. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus for providing access paths comprising:
   an input configured to receive a relative position of at least one access path relative to at least one swath; and
   logic coupled to the input for automatically determining locations of access paths to be taken using the relative position of the at least one access path.

2. The apparatus of claim 1, wherein the input further receives a quantity of swaths in a group, the access paths located between groups.

3. The apparatus of claim 2, wherein the input further receives a swath width, an access path width and an application width, wherein the swath width, access path width and application width are further used by the logic to determine locations access path.

4. The apparatus as set forth in claim 1, wherein the logic selectively determines compaction paths.

5. The apparatus as set forth in claim 4, wherein compaction is selected from the group consisting of compaction spreading and compaction concentration.

6. The apparatus as set forth in claim 1, wherein the logic is selected from the group consisting of a central processing unit and hard wired logic.

7. The apparatus as set forth in claim 1, further comprising a positioning receiver configured to determine a position of a swathing apparatus.

8. The apparatus as set forth in claim 7, wherein the positioning receiver is selected from the group consisting of global positioning receiver, pseudolite receiver, and Glonass receiver.

9. The apparatus of claim 1, further comprising a graphic user interface (GUI) coupled to the input and configured to user data as input.

10. The apparatus as set forth in claim 1, wherein the apparatus is a vehicle and further comprises control equipment to automatically move the vehicle to determined locations of access paths.

11. The apparatus as set forth in claim 9, wherein the apparatus is a vehicle and the GUI further comprises a guidance display to guide a driver of the vehicle along access paths.

12. A machine-readable medium having stored thereon instructions, which when executed by a processor, causes said processor to perform the following:
   indicate a relative position of at least one access path relative to at least one swath: and
   automatically determine locations of access paths to be taken using the relative position of at least one access path.

13. The machine-readable medium according to claim 12, wherein the processor further performs:
   moving a vehicle to the location of the access path.

14. The machine-readable medium according to claim 12, wherein the processor further performs:
   identifying a quantity of swaths in a group, the access paths located between groups;
   identifying a swath width;
   identifying an access path width; and
   identifying an application width wherein the swath width, access path width and application width further provide locations of access paths.

* * * * *